United States Patent Office 3,098,728
Patented July 23, 1963

3,098,728
LEADED GASOLINE CONTAINING
PHOSPHORATE
Everett N. Case and Robert R. Chambers, Homewood, Ill., assignors, by mesne assignments, to Sinclair Research Inc., New York, N.Y., a corporation of Delaware
No Drawing. Filed Feb. 24, 1959, Ser. No. 794,854
5 Claims. (Cl. 44—69)

This invention relates to an improved gasoline composition which is of high octane number, which contains a lead compound as an anti-knocking agent and contains a gasoline compatible olefin-$P_2O_5$ phosphorate.

By and large, modern gasolines for use in spark-ignited internal combustion engines have an octane number of at least 85 RON, that is, as determined by the research method. Almost without exception producers of gasoline use non-hydrocarbon agents to raise the octane number of the gasoline. Generally this agent is a tetraalkyl lead, especially tetraethyl lead, usually within the range from about 0.5 to 3.0 cc. per gallon, or even as much as approximately 4.5 cc. per gallon, as a knock-suppressing agent. Tetraethyl lead is the most widely used anti-knock agent, and is very effective for this purpose, but it suffers from the defect that it causes lead-containing deposits in the cylinders. These deposits have a tendency to cause preignition; that is, the deposits are hot and cause the mixture in the cylinder to burn before combustion in initiated at the proper time by the spark plug. Preignition can be controlled, as the art is aware, by the addition of phosphorus additives to leaded gasoline. However, the phosphorus additive must be properly chosen, or otherwise when the engine is put into service and operated, the octane requirement increase encountered as the engine cylinders build up deposits will be greater than that which takes place when no phosphorus additive is used.

In accordance with this invention, a gasoline compatible phosphorate is incorporated into leaded gasoline with the result that preignition is suppressed and the octane requirement increase as the engine is used is less than that encountered with the base fuel, that is, the leaded gasoline in which no phosphorus additive is incorporated. The phosphorate is incorporated into the gasoline generally in the amount of from about 0.5 to 2 theories, and preferably in the amount of from about 0.2 to 0.6 theory, 1.0 theory meaning that for each three gram atoms of lead present in the tetraethyl lead there are present two gram atoms of phosphorus. One theory is based upon the premise that the phosphorate and the lead in the tetraethyl lead react in the combustion zone to form lead orthophosphate, $Pb_3(PO4)_2$. Stated somewhat differently, for each three gram moles of tetraethyl lead present in the gasoline, there is also generally present from about 0.1 to 4 gram atoms of phosphorus and preferably from about 0.4 to 1.2 gram atoms of phosphorus.

The phosphorates which are added to leaded gasoline to produce the composition of the invention have the advantage that they can be very easily prepared from a variety of readily available starting materials. The phosphorates are the reaction products of yellow phosphorus, free oxygen and an olefin of 8 to 20 carbon atoms. The products are monomers or polymers containing up to about 5 to 10 monomer units, and structurally appear to have divalent hydrocarbon groups joined by divalent —$P_2O_5$— radicals to give (—R—$P_2O_5$—)$_n$, where R is the olefin residue and $n$ is a number from 1 to about 5 to 10. Two articles by Walling et al. volume 80, Journal of the American Chemical Society, pp. 4543 to 4549, set forth possible structures of these compounds as well as a method for their preparation.

In general, the phosphorates used in the composition of this invention are the gasoline compatible, i.e., soluble, miscible or dispersible products of the reaction of yellow phosphorus and an unsaturated hydrocarbon in the presence of oxygen. The ease of preparing compatible phosphorates from olefins of 10 to 20 carbon atoms makes these olefins the preferred starting materials. These hydrocarbons may be substituted with, for example, alkyl or halogens, as well as aryl. "Gasoline-compatible" includes those phosphorates which are only slightly soluble in gasoline, as long as enough dissolves to give about 0.5 to 2 theories of phosphorus in the leaded gasoline. Triisobutylene, 1-dodecene, and 1-hexadecene, for example, are suitable starting materials for oil-soluble phosphorates.

The phosphorate is prepared by reacting an olefin-yellow phosphorus mixture with a molecular oxygen-containing gas, such as oxygen, air or oxygen-enriched air. The reaction proceeds easily at a temperature of about 20–100° C. when the olefin and phosphorus are dissolved in a suitable inert solvent such as benzene or toluene containing an initiator such as azobisisobutyronitrile. With the preferred long chain olefin starting materials such as 1-hexadecene, the phosphorate product remains in solution in the benzene or toluene. This solution may be concentrated and the concentrate added to the leaded gasoline, or the phosphorate may be recovered in dry form for incorporation in the fuel. In the reaction two atoms of phosphorus are supplied for each olefin molecule to be reacted; but preferably some excess olefin is supplied to insure the proper reaction.

In obtaining the novel composition of the invention the phosphorate can be incorporated into a blend containing all of the gasoline hydrocarbons or the phosphorate or its concentrate can be first incorporated in any one or any combination of the hydrocarbon components before final blending, or it may be added along with other additives which are included in the finished gasoline, such as deicing additives, as all that is required to accomplish the desired result is the incorporation of the phosphorate in the leaded gasoline by any convenient route.

Any phosphorus deficiency in the final leaded fuel may be made up by the inclusion of elemental yellow phosphorus. Also, the phosphorates may be used to mitigate the octane requirement increase of gasolines which are given preignition suppressing properties by means of other organic phosphorus compounds such as dibutyl butyl phosphonate, phenylpropylene phosphite, tributyl phosphite hexamethyl phosphoramide, bis(2-ethylhexyl) hydrogenphosphite, triaryl phosphate, dimethyl xylyl phosphate, the diethylamine salt of mixed mono and diisooctyl acid phosphate, triethylene diphosphite, tributyl phosphate, diethylene glycol tetrabutyl diphosphate, dibutyl phosphite, 2-ethylhexyl tetramethyl phosphoro-diamidate, tributyoxyethyl phosphate and tributyl phosphine.

Example

As a specific illustration of the practice of the invention, there was first obtained a sample of base gasoline which was composed of a major amount of heavy reformate from straight run naphtha and a minor amount of light catalytically cracked gasoline. The base gasoline contained 3 cc. per gallon of tetraethyl lead together with the usual scavengers and had an API gravity of 39.2. The base gasoline, when containing the tetraethyl lead, had an octane number of 103.1 by the research method and an octane number of 91.1 by the motor method. The ASTM distillation of the gasoline was as follows:

| | °F. |
|---|---|
| Initial boiling point | 115 |
| 10 percent | 210 |
| 50 percent | 324 |
| 90 percent | 357 |
| End point | 421 |

Into a portion of the base gasoline there is dissolved 0.3 theory of 1-dodecyl phosphorate made essentially in accordance with the cited Walling et al. publications, this amount being about 0.2 gram of phosphorate per gallon of base gasoline. When the base gasoline and the base gasoline containing the 1-dodecyl phosphorate are subjected to comparative tests in a spark-ignited single cylinder combustion engine, it is found that the gasoline containing the phosphorate shows a ping count less than half that of the base gasoline.

A second sample of base fuel was obtained, this particular sample being composed of a mixture of alkylate, heavy reformate from straight run naphtha, light catalytically cracked gasoline and butane. This particular gasoline contained 3 cc. per gallon of tetraethyl lead together with the usual scavengers, had an API gravity of 53.6, an octane number by the research method of 101.4 and an octane number by the motor method of 91.4. The ASTM boiling range of the second base gasoline was as follows:

| | °F. |
|---|---|
| Initial boiling point | 90 |
| 5 percent | 118 |
| 50 percent | 264 |
| 90 percent | 319 |
| End point | 381 |

Into a portion of the second base leaded gasoline there is dissolved a 1-hexadecyl phosphorate prepared in accordance with the cited Walling et al. publications and apparently containing about 5 monomer units in the amount of about 0.3 theory (about 0.24 gram per gallon). The second base gasoline and a sample thereof containing the phosphorate are then tested in a 1957 model automobile engine for octane requirement increase. With the engine tested at 1500 r.p.m. the octane requirement is found to increase one less octane number after 210 hours when the fuel with the phosphorate is used. With the base fuel a test for 210 hours at 2500 r.p.m. shows even greater octane requirement increase while when the fuel containing the phosphorate is used the octane requirement increase is significantly less than in the 1500 r.p.m. test.

It is claimed:
1. A leaded gasoline consisting essentially of base gasoline, about 0.5 to 4.5 cc. per gallon of tetraalkyl lead anti-knock agent and about 0.05 to 2 theories of a phosphorate product obtained by reacting a molecular oxygen-containing gas, yellow phosphorus and an olefinic hydrocarbon of 8 to 20 carbon atoms to combine about 2 moles of phosphorus per mole of olefin, at a temperature of about 20 to 100° C.
2. Gasoline according to claim 1 containing about 0.2 to 0.6 theory of phosphorate.
3. Gasoline according to claim 1 where the phosphorate is of an olefin of 10 to 20 carbon atoms.
4. Gasoline according to claim 3 where the phosphorate is dodecyl phosphorate.
5. Gasoline according to claim 3 where the phosphorate is hexadecyl phosphorate.

References Cited in the file of this patent

UNITED STATES PATENTS

| | | |
|---|---|---|
| 2,405,560 | Campbell | Aug. 13, 1946 |
| 2,784,208 | Ries | Mar. 5, 1957 |
| 2,794,718 | Bartleson | June 4, 1957 |
| 2,860,958 | Gilbert | Nov. 18, 1958 |
| 2,892,691 | Howell | June 30, 1959 |
| 2,897,068 | Pellegrini et al. | July 28, 1959 |
| 2,897,071 | Gilbert | July 28, 1959 |
| 2,935,518 | Reetz | May 3, 1960 |

OTHER REFERENCES

"The Study of Fuel Additives to Reduce Preignition," by Burk et al., Proceedings of the American Petroleum Institute, vol. 34 (III), 1954, Division of Refining, pp. 270–277.